US010551973B2

(12) United States Patent
Huijser et al.

(10) Patent No.: US 10,551,973 B2
(45) Date of Patent: Feb. 4, 2020

(54) METHOD OF CONTROLLING A MOBILE DEVICE

(71) Applicant: NXP B.V., Eindhoven (NL)

(72) Inventors: Jan Paulus Freerk Huijser, Nijmegen (NL); Deheng Liu, Veldhoven (NL); Min Li, Leuven (BE); Shawn William Scarlett, Nijmegen (NL); Jose Manuel Gil-Cacho Lorenzo, Brussels (BE)

(73) Assignee: NXP B.V., Eindhoven (NL)

( * ) Notice: Subject to any disclaimer, the term of this patent is extended or adjusted under 35 U.S.C. 154(b) by 39 days.

(21) Appl. No.: 15/554,769

(22) PCT Filed: Aug. 12, 2015

(86) PCT No.: PCT/EP2015/068584
§ 371 (c)(1),
(2) Date: Aug. 31, 2017

(87) PCT Pub. No.: WO2016/138966
PCT Pub. Date: Sep. 9, 2016

(65) Prior Publication Data
US 2018/0246591 A1    Aug. 30, 2018

(30) Foreign Application Priority Data

Mar. 2, 2015  (EP) .................................. 15157120

(51) Int. Cl.
| G06F 3/043  | (2006.01) |
| G06F 3/0488 | (2013.01) |
| G06F 3/01   | (2006.01) |
| H04M 1/02   | (2006.01) |

(52) U.S. Cl.
CPC .............. G06F 3/043 (2013.01); G06F 3/017 (2013.01); G06F 3/0488 (2013.01); H04M 1/0266 (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| 4,991,148 A * | 2/1991 | Gilchrist | G01S 5/30 178/18.04 |
| 6,600,938 B1 * | 7/2003 | Suzuki | B06B 1/045 340/384.1 |

(Continued)

FOREIGN PATENT DOCUMENTS

EP    2 584 459 A1    4/2013

*Primary Examiner* — William Lu

(57) ABSTRACT

A method of controlling a mobile device is described, the method comprising: receiving a time varying current or voltage of a signal generated on the terminals of an acoustic transducer of the mobile device, the time varying current or voltage being generated in response to a tapping and/or sliding motion on a surface of the mobile device performed by a user; comparing the time varying signal characteristics with a set of predetermined signal characteristics; and generating at least one user command in dependence of the comparison. The mobile device may reliably detect complex user commands using an acoustic transducer.

17 Claims, 8 Drawing Sheets

(56) References Cited

U.S. PATENT DOCUMENTS

| | | | | |
|---|---|---|---|---|
| 6,981,204 B2* | 12/2005 | Sakai | G06F 11/14 | 714/700 |
| 7,400,910 B2* | 7/2008 | Matsumoto | H04M 1/03 | 381/345 |
| 2002/0126104 A1* | 9/2002 | Knowles | G06F 3/0436 | 345/177 |
| 2003/0118193 A1* | 6/2003 | Leske | H04R 29/003 | 381/59 |
| 2004/0047120 A1* | 3/2004 | Saiki | G06F 1/1616 | 361/679.26 |
| 2004/0263490 A1* | 12/2004 | Kent | G06F 3/0436 | 345/177 |
| 2005/0083313 A1* | 4/2005 | Hardie-Bick | G06F 3/0433 | 345/177 |
| 2008/0018435 A1* | 1/2008 | Brown | G06F 19/3418 | 340/286.07 |
| 2008/0122796 A1* | 5/2008 | Jobs | G06F 3/0488 | 345/173 |
| 2009/0235750 A1* | 9/2009 | Chang | G06F 3/0416 | 73/627 |
| 2010/0315570 A1* | 12/2010 | Mathew | G06F 1/1637 | 349/58 |
| 2010/0318205 A1* | 12/2010 | Ohkuri | H04R 3/002 | 700/94 |
| 2011/0037734 A1* | 2/2011 | Pance | G06F 3/016 | 345/177 |
| 2011/0148608 A1* | 6/2011 | Grant | G06F 1/1626 | 340/407.2 |
| 2012/0027239 A1* | 2/2012 | Akino | H04R 1/28 | 381/345 |
| 2012/0112930 A1* | 5/2012 | Ivanov | G06F 3/01 | 341/20 |
| 2012/0313900 A1* | 12/2012 | Dahl | G06F 3/043 | 345/177 |
| 2013/0259238 A1* | 10/2013 | Xiang | G06F 3/017 | 381/17 |
| 2013/0329895 A1* | 12/2013 | Dusan | H04R 29/00 | 381/56 |
| 2014/0344909 A1* | 11/2014 | Raji | H04L 63/10 | 726/7 |
| 2014/0369512 A1* | 12/2014 | Slupeiks | H04R 3/00 | 381/59 |
| 2015/0029112 A1* | 1/2015 | Macours | H03K 17/96 | 345/173 |
| 2015/0049056 A1* | 2/2015 | Post | G06F 3/046 | 345/174 |
| 2015/0085620 A1* | 3/2015 | Macours | H03G 3/3005 | 367/199 |
| 2015/0334489 A1* | 11/2015 | Iyengar | H04R 3/04 | 381/71.6 |
| 2019/0025768 A1* | 1/2019 | Dangy Caye | G04G 21/00 | |

* cited by examiner

10000

11000

METHOD OF CONTROLLING A MOBILE DEVICE

This disclosure relates to a method and apparatus for controlling a mobile device.

Many mobile devices such as smart phones and tablet computers have a touch screen and motion sensor and users are able to interact or control mobile devices in a very flexible and convenient way. In particular user control based on touching which includes for example tapping, knocking or swiping a surface of the mobile device are intuitive and easy to use.

Mobile devices such as smart phones use consumer class motion sensors and touch screens to detect finger swipes, and touch positions for user commands to the mobile device. Consumer class motion sensors are developed to respond to human motions which are typically at frequencies below 50 Hz whereas some touching actions can generate frequencies of 20 KHz or even higher. Furthermore charge amplifiers are needed to amplify the capacitive signals generated by the motion sensors.

Touch screen sensor based solutions have limited robustness since touch screens can detect valid signals even when close to any skin. Furthermore, row/column signals need to be continuously scanned at a relatively high frequency which requires the touch screen to be continuously powered.

SUMMARY

Various aspects of the invention are defined in the accompanying claims.

In a first aspect there is described a mobile device comprising an acoustic transducer having a pair of terminals; a sensor coupled to the acoustic transducer; a controller coupled to the sensor; wherein the controller is configured to: receive a time varying current or voltage of a signal generated on the terminals of the acoustic transducer in response to at least one of a tapping and sliding motion performed by a user on a surface of the mobile device; and generate at least one user command in response to a comparison between one or more time-varying signal characteristics of the induced current and/or voltage waveform and a predetermined set of time-varying signal characteristics.

The mobile device may reliably detect complex sequences of taps by a user which may be used to control the device. The user may control the mobile device by performing a tapping action or a sliding motion such as a finger swipe any part of the surface of the mobile device. In mobile devices such as mobile smart phones, this may enable an alternative method of controlling the device to, for example a touch screen, allowing a user to tap anywhere to control the device. In other mobile devices including an audio transducer which may be portable and battery operated such as a laptop, wearable device, personal digital assistant, mp3 audio player, portable medical equipment, camera, or a toy, the detected taps may be used to control the device without the need for a touch screen or other user interface.

In embodiments the acoustic transducer may comprise a loudspeaker.

In embodiments the acoustic transducer may comprise a microphone.

In embodiments, the mobile device may further comprise a further acoustic transducer, wherein the at least one user command comprises a mute/unmute command and wherein the controller is further operable to mute or unmute at least one of the acoustic transducer and the further acoustic transducer.

In embodiments the mobile device may be configured as a sound recorder and the at least one user command may comprise a start/stop command to start or stop the sound recorder.

In embodiments, the mobile device may comprise a mobile phone having a first major surface having a display and a second major surface, and wherein the controller is operable to generate the at least one user command in response to a tapping and/or sliding motion performed by a user on the second major surface.

The mobile phone may generate a user command in response to a tap on the back of the housing rather than the touch screen display. A user may control the mobile phone by tapping anywhere on the mobile device. This may allow for example a user to issue a user command by tapping the mobile device while holding the mobile device with the same hand.

In embodiments the at least one user command of a mobile phone may comprise a command to switch between a first phone call and a second phone call, and wherein the mobile phone is operable to switch between phone calls in response to a user tapping the second major surface of the mobile phone.

In embodiments the at least one user command may comprise a command to take a picture. A mobile device including a camera may respond to one or more taps of a user on the mobile device, detected via an acoustic transducer by taking a picture such as a "Selfie" or other picture in response to a tap on the back of the mobile device. In embodiments of a mobile device including a display, such as a touch screen, the display may be disabled while the user commands are processed.

In embodiments the user command may comprise an unlock command to unlock the screen of a mobile device such as a smart phone.

In embodiments the time-varying characteristics compared may comprise at least one of amplitude, phase, and frequency.

In a second aspect there is described a method of controlling a mobile device, the method comprising: receiving a time varying current or voltage of a signal generated on the terminals of an acoustic transducer of the mobile device, the time varying current of voltage being generated in response to a tapping and/or sliding motion on a surface of the mobile device performed by a user; comparing the time varying signal characteristics with a set of predetermined signal characteristics; and generating at least one user command in dependence of the comparison.

In embodiments, comparing the time varying signal characteristics comprises extracting a plurality of features from the signal, classifying the signal features and comparing the classified features with a predetermined set of features.

In embodiments the plurality of features may be extracted in at least one of the frequency domain and the time domain.

In a third aspect there is described a computer program product comprising instructions which, when being executed by a processing unit, cause said processing unit to perform the steps of receiving a time varying current or voltage of a signal generated on the terminals of an acoustic transducer of the mobile device, the time varying current of voltage being generated in response to a tapping and/or sliding motion on a surface of the mobile device performed by a user; comparing the time varying signal characteristics with a set of predetermined signal characteristics; and generating at least one user command in dependence of the comparison.

In a further aspect there is defined a mobile device comprising: an acoustic transducer operable to generate an input signal in response to a user providing an encoded user input by touching the mobile device at least once, the input signal comprising a vibration signal component and an acoustic signal component; a signal feature extractor for extracting features in the time and frequency domain, the signal feature extractor having an input coupled to the acoustic transducer and operable to extract a plurality of signal features from at least one of the vibration signal component and the acoustic signal component and to generate an encoded output signal; a signal classifier having an input coupled to an output of the signal feature extractor and operable to decode the encoded output signal with at least one expected encoded sequence and to output a decoded signal; an event dispatcher having an input coupled to the output of the signal classifier and operable to trigger a user command in response to the decoded signal.

The mobile device may reliably decode complex user encoded inputs generated by touching the mobile device. The mobile device may reliably extract signal features at frequencies of up to 20 KHz. Signal features extracted may include one or more of a peak value, a frequency spectrum shape, a peak value at different frequencies, and how the shape of the spectrum evolves over time. The encoded user input may have information encoded by the timing of touching. The encoded user input may have information encoded by the force of touching. The encoded user input may have information encoded by the position of touching the mobile device. The acoustic transducer may be a microphone or a loudspeaker, or may be a mobile device vibrator unit such as a linear vibrator such as for example used in mobile phones.

The mobile device may be for example a wearable device, a mobile phone, a smart watch, a tablet, a laptop, a portable medical device, a toy, or other portable device including a speaker. The user commands triggered may be for example to wake up the mobile device from a standby mode, to mute a microphone while making a phone call, or to open an email application.

In embodiments the acoustic transducer may comprise a loudspeaker. Using a speaker or loudspeaker as an input device to detect vibration and acoustic signals may reduce power consumption since the speaker may act as a passive sensor.

Embodiments may further comprise a signal conditioner arranged between the acoustic transducer and the signal feature extractor operable to generate an artificial noise floor from the input signal.

Embodiments including the signal conditioner may comprise a filter configured to output an artificial noise floor, and a second filter configured to smooth the input signal.

In embodiments including the signal conditioner, the signal conditioner may be a digital signal conditioner and the filter may be a linear or non-linear digital filter.

The signal conditioner may generate an artificial noise floor to remove false artefacts which may be incorrectly interpreted as encoded user inputs. This may improve the reliability of detecting an encoded user input so that more complex user commands may be decoded from the signal induced on the acoustic transducer.

In embodiments the mobile device may comprise a further acoustic transducer, a signal source multiplexer having respective inputs coupled to the acoustic transducer and the further acoustic transducer, an output coupled to an input of the signal feature extractor, and a controller coupled to the signal source multiplexer, wherein the controller is operable to couple at least one of the acoustic transducer and the further transducer to the signal classifier.

Detecting combined signals from multiple acoustic transducers may improve the position detection of an encoded user input signal, allowing more complex user encoded inputs to be accurately decoded.

In embodiments the mobile device may comprise a proximity sensor; a proximity sensor feature extractor having an input coupled to the proximity sensor and an output coupled to the signal classifier; and wherein the signal classifier is further operable to decode a combination of the encoded output signal and the output of the proximity sensor feature extractor and to output a decoded signal.

In embodiments the mobile device may comprise a motion sensor; a motion sensor feature extractor having an input coupled to the proximity sensor and an output coupled to the signal classifier; and wherein the signal classifier is further operable to decode a combination of the encoded output signal and the output of the proximity sensor feature extractor and to output a decoded signal.

The vibration and acoustic features extracted from the encoded user input received from the acoustic transducer may be combined with other sensor data for encoding complex user input commands. For example, a user input may only activate a mobile device when the mobile device is held in a specific orientation combined with a predetermined sequence of tapping of the housing of the mobile device.

In embodiments the mobile device may comprise a wireless transceiver, a remote sensor feature extractor coupled to the wireless transceiver and the signal classifier, wherein the signal classifier is operable to compare a remote encoded output signal received from the remote sensor feature extractor with an encoded output signal received from the signal feature extractor and to output a decoded signal indicative of a match between the remote encoded output signal and the encoded output signal, and wherein the mobile device is operable to authenticate a wireless connection between the mobile device and a further device in response to the decoded output signal. A mobile device such as a smart phone may be paired together with a further device by detecting the acoustic/vibration response caused by tapping the two devices together. The further device may detect the response via an acoustic transceiver and transmit the decoded response to the mobile device via a wireless interface which may be a radio frequency (RF), infrared or other wireless interface. The mobile device may compare the further decoded signal received from the further mobile device and compare the received signal with the decoded signal from the encoded user input detected from the acoustic transducer of the mobile device. If the decoded signal and the further decoded signal match then the wireless interface may be enabled for communication between the two mobile devices.

In embodiments the signal extractor may comprise a peak detector.

In embodiments, the signal extractor may comprise a counter coupled to the peak detector and wherein the signal extractor is operable to increment the counter in response to a peak being detected.

In embodiments the signal extractor may comprise a force-based event remover.

In embodiments the signal extractor may comprise a timing-based event remover.

Removing events based on a force detected which is outside expected parameter limits or events occurring at unexpected time intervals may reduce the number of false events and so improve the reliability of detecting encoded user inputs. Improving the reliability of detecting encoded user inputs may allow more complex encoded user inputs to be decoded by the mobile device via the acoustic transducer.

In embodiments the signal extractor may comprise a glitch filter. Removing glitches in the input signal may reduce the number of false events, which may improve the reliability of the decoding the encoded user input.

In a further aspect there is described a method of controlling a mobile device, the mobile device comprising an acoustic transducer, the method comprising receiving an input signal from the acoustic transducer, the input signal comprising a vibration signal component and an acoustic signal component and being generated in response to a user providing an encoded user input by touching the mobile device at least once; extracting a plurality of features from each of the vibration signal component and the acoustic signal component to generate an encoded output signal; decoding the encoded output signal with at least one expected encoded sequence and outputting a decoded signal, and trigger a user command in response to the decoded output signal pattern.

The method may for example be implemented in hardware, software for execution by for example a digital signal processor or a combination of hardware and software.

BRIEF DESCRIPTION OF THE DRAWINGS

In the figures and description like reference numerals refer to like features. Embodiments of the invention are now described in detail, by way of example only, illustrated by the accompanying drawings in which.

DESCRIPTION

Figure 1:
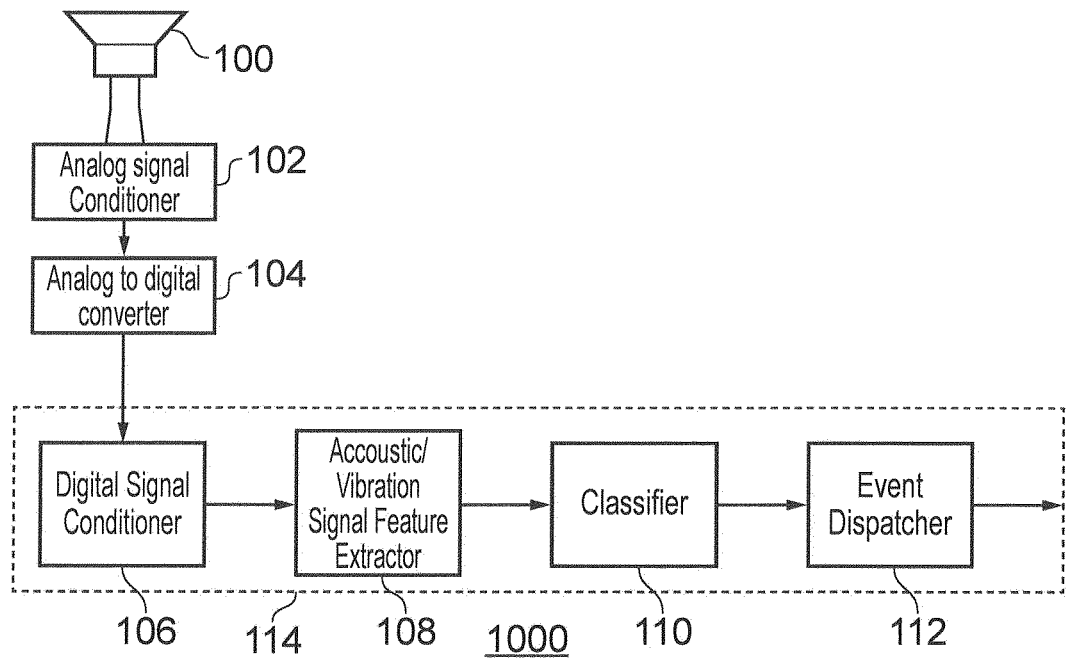
FIG. 1 shows a mobile device according to an embodiment.

FIG. 1 shows a mobile device 1000. A loudspeaker or speaker 100 may have the speaker terminals connected to the input of an analog signal conditioner 102. The analog signal conditioner 102 may include one or more filters. The analog signal conditioner 102 may include one or more amplifiers. An output of the analog signal conditioner 102 may be connected to an analog to digital convertor 104. The output of an analog to digital converter 104 may be connected to a digital signal conditioner 106. The digital signal conditioner 106 may include a digital filter such as a finite impulse response filter, an infinite impulse response filter, a decimation filter, or an autoregressive moving average filter. An output of digital signal conditioner 106 may be connected to a signal feature extractor 108. An output of the signal feature extractor 108 may be connected to the input of the classifier module 110. Classifier module 110 may compare or classify an encoded output sequence from the feature extractor 108 with reference to a predetermined set of expected encoded output sequences. The classifier module 110 may generate a decoded output signal from the classified encoded signal. An output of the classifier module 110 may be connected to the event dispatcher 112.

Digital signal conditioner 106, the signal feature extractor 108, the classifier module 110, and the event dispatcher 112 as shown in FIG. 1 may be implemented in software running on a digital signal processor 114. Alternatively, one or more of a digital signal conditioner 106, acoustic vibration feature extractor 108, classifier module 110, and event dispatcher 112 may be implemented in hardware.

In operation of the mobile device 1000, a user may wish to input an encoded signal by, for example, tapping or knocking the mobile device 1000 with a predetermined sequence of taps or knocks. The action of a user tapping the housing of the mobile device 1000 induces vibrations which in turn may cause the speaker 100 to vibrate and induce a varying voltage and/or current signal on the terminals of the speaker 100. The induced varying voltage and/or current signal may be filtered or amplified by the analog signal conditioner 102. The output of the analog signal conditioner 102 may be converted to a digital representation of the signal by analog to digital converter 104. The digitised input signal may then be filtered by the digital signal conditioner 106, which may compare the digitised input signal with an artificial noise floor in order to reject false triggers. The digital signal conditioner 106 may also apply a decimation filter to the digitised input signal to reduce the bandwidth of the input signal. The bandwidth of the input signal may be reduced to for example 2 kHz.

The output of the digital signal conditioner 106 may then be processed by the signal feature extractor 108. The signal feature extractor 108 may extract signal features from the acoustic signal component of the encoded input signal. The signal feature extractor 108 may extract signal features from the vibration signal component of the encoded input signal. The features of the encoded input signal may be extracted in the time domain by for example detecting peaks within a predefined interval. The peak detection may be a detection of a peak of the amplitude of the whole signal. Alternatively or in addition the input signal may be split into separate frequency components and the peaks may be detected for different frequencies. The signal feature extractor 108 may extract features in the frequency domain based on the shape of the frequency spectrum of the encoded input signal. The signal feature extractor 108 may extract features based on the time coherence of shape of the spectrum of the encoded input signal. The signal feature extractor 108 may extract features based on the variation of certain frequency bins of the spectrum of the encoded input signal. The features may be based on short time FFT analysis, or a combination with image processing techniques applied to spectrograms of the encoded input signal.

The input signal may be transformed between the frequency domain and the time domain for feature extraction by applying a fast Fourier transform. The skilled person will appreciate that other signal transformations may be used.

The detection of a peak in the digitised conditioned input signal may be interpreted as a user tapping or knocking the mobile device 1000. Consequently a sequence of taps/knocks separated by periods of silence may be converted into a digital sequence representing an encoded user input by the signal feature extractor 108. The skilled person will appreciate that this digital sequence or output pattern may be classified into predefined expected encoded patterns or sequences by the classifier module 110. The predefined expected encoded patterns may be characterised by a certain timing sequence, a certain force applied by the user, or a position at which the user touched the housing of the mobile device 1000. Classifier module 110 may classify the output pattern by an exact match to a predefined pattern. Alternatively classifier module 110 may classify the output pattern by use of one or more of a Bayesian network, a Gaussian mixture model, a K-nearest neighbour classification and a Support vector machine. The choice of the classification method may depend on the intrinsic properties of the input signal and application constraints. For example, a K-nearest neighbour classification may be applied if the size of training set is limited and the feature vector length is short. A support vector machine may be applied when nonlinear separation is preferred. A Bayesian network may be applied if an inferring network can be analysed for the internal behaviours of the system.

If a match is detected by the classifier module 110, the matched output pattern may be decoded and received by the event dispatcher 112 which may generate an event in response to the decoded user input. This event may be for example an interrupt to wake up the mobile device from a standby mode of operation. Alternatively an event may be to select a predefined action such as for example to increase an audio volume while playing music.

The loudspeaker 100 may not require a bias voltage in its normal operation to output audio signals. Consequently, the detection of an encoded user input sequence may be achieved at a lower power level than detection using a microphone. For example, the mobile device 1000 may decode an encoded user input representing a command to wake-up the mobile device 1000 from a standby mode of operation.

Mobile device 1000 may be able to detect an encoded user input based on for example the position at which a user taps the housing of the mobile device 1000. The accuracy of the position detection may be improved by making use of multiple acoustic transducers i.e. microphones and loudspeakers. This is illustrated, for example, in the mobile device 2000 shown in FIG. 2.

Figure 2:
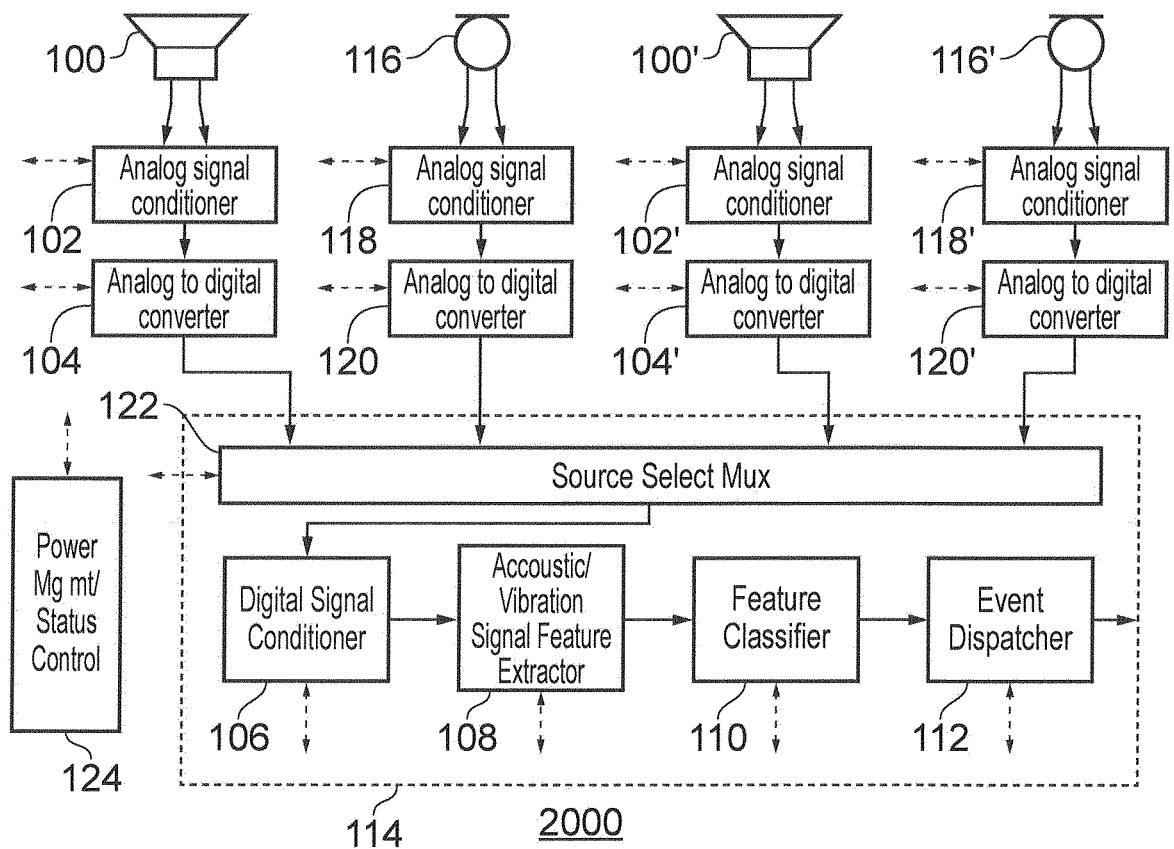
FIG. 2 illustrates a further mobile device according to an embodiment.

FIG. 2 shows a mobile device 2000. A loudspeaker 100 may have the speaker terminals connected to the input of an analog signal conditioner 102. An output of the analog signal conditioner 102 may be connected to an analog to digital convertor 104. The output of an analog to digital converter 104 may be connected to a signal source multiplexer 122. A second loudspeaker 100' may have the terminals connected to the input of an analog signal conditioner 102'. An output of the analog signal conditioner 102' may be connected to an analog to digital convertor 104'. The output of an analog to digital converter 104' may be connected to a signal source multiplexer 122.

A microphone 116 may have the terminals connected to the input of a signal conditioner 118. An output of the signal conditioner 118 may be connected to an analog to digital convertor 120. The output of an analog to digital converter 120 may be connected to a signal source multiplexer 122. A second microphone 116' may have the terminals connected to the input of a signal conditioner 118'. An output of the signal conditioner 118' may be connected to an analog to digital convertor 120'. The output of an analog to digital converter 120' may be connected to a signal source multiplexer 122.

The output of the signal source multiplexer 122 may be connected to the digital signal conditioner 106. An output of digital signal conditioner 106 may be connected to a signal feature extractor 108. An output of the signal feature extractor 108 may be connected to the input of the classifier module 110. Classifier module 110 may compare an output of the signal feature extractor 108 with a predetermined set of expected features. An output of the classifier module 110 may be connected to the event dispatcher 112.

Power management and control module 124 may be connected to analog signal conditioners 102,102',118,118', and analog to digital converters 104,104',120,120'. Power management and control module 124 may be connected to signal source multiplexer 122, digital signal conditioner 106, signal feature extractor 108, classifier module 110, and event dispatcher 112. Power management and control module 124 may control the power supply and also monitor the status of the various other modules. The skilled person will appreciate that the power management and control module 124 may power down one or all of the connected components dependent on the mode of operation of the mobile device 2000. The connection between the power management and control module 124 and the other components are shown by the dashed line connections.

The operation of the mobile device 2000 is similar to that of mobile device 1000. However the signal source multiplexer 122 may be controlled by the power management and control module 124 to route one or more of signals from the loudspeaker 100, the microphone 116, the second loudspeaker 100', and the second microphone 116' to the digital signal conditioner 106. When a user provides an encoded input signal by for example tapping the housing of the mobile device 2000, the input signal received by the digital signal conditioner 106 may be a single signal from one of the loudspeakers 100, 100' and the microphones 116, 116'. Alternatively the input signal received by the digital signal conditioner 106 may be a combination of a signal from two or more of the loudspeaker is 100, 100' and the microphones 116, 116'. By using an input signal from two or more acoustic transducers, the position of a user input may be more accurately determined, since the respective induced signals in each of the two or more acoustic transducers may have different phase and amplitudes with respect to each other dependent on the position at which a user applies a force or touches the mobile device. The additional information provided from the two or more acoustic transducers may be used for example to detect a swiping action performed by a user on the surface of the mobile device.

The microphone 116 and the second microphone 116' may require a bias voltage to operate correctly, and therefore may have a higher power requirement than a loudspeaker 100, and the loudspeaker 100' when used as an input device. However microphone 116 and the second microphone 116' may be more sensitive to vibrations and acoustic inputs. The signal source multiplexer 122 may select the loudspeaker 100, and/or the second loudspeaker 100' as an input device in a low power mode of operation which may be a standby mode. The signal source multiplexer 122 may select the microphone 116 and/or the second microphone 116' as an input device in a higher power mode of operation of the mobile device 2000.

Components of the mobile device 2000 may be implemented as hardware, software or a combination of hardware and software. For example signal source multiplexer 122, digital signal conditioner 106, signal feature extractor 108, signal feature classifier 110 and event dispatcher 112 may be implemented as software modules on a programmable digital signal processor 114 or other controller. Power management module 124 may be implemented as logic hardware or software.

Figure 3:
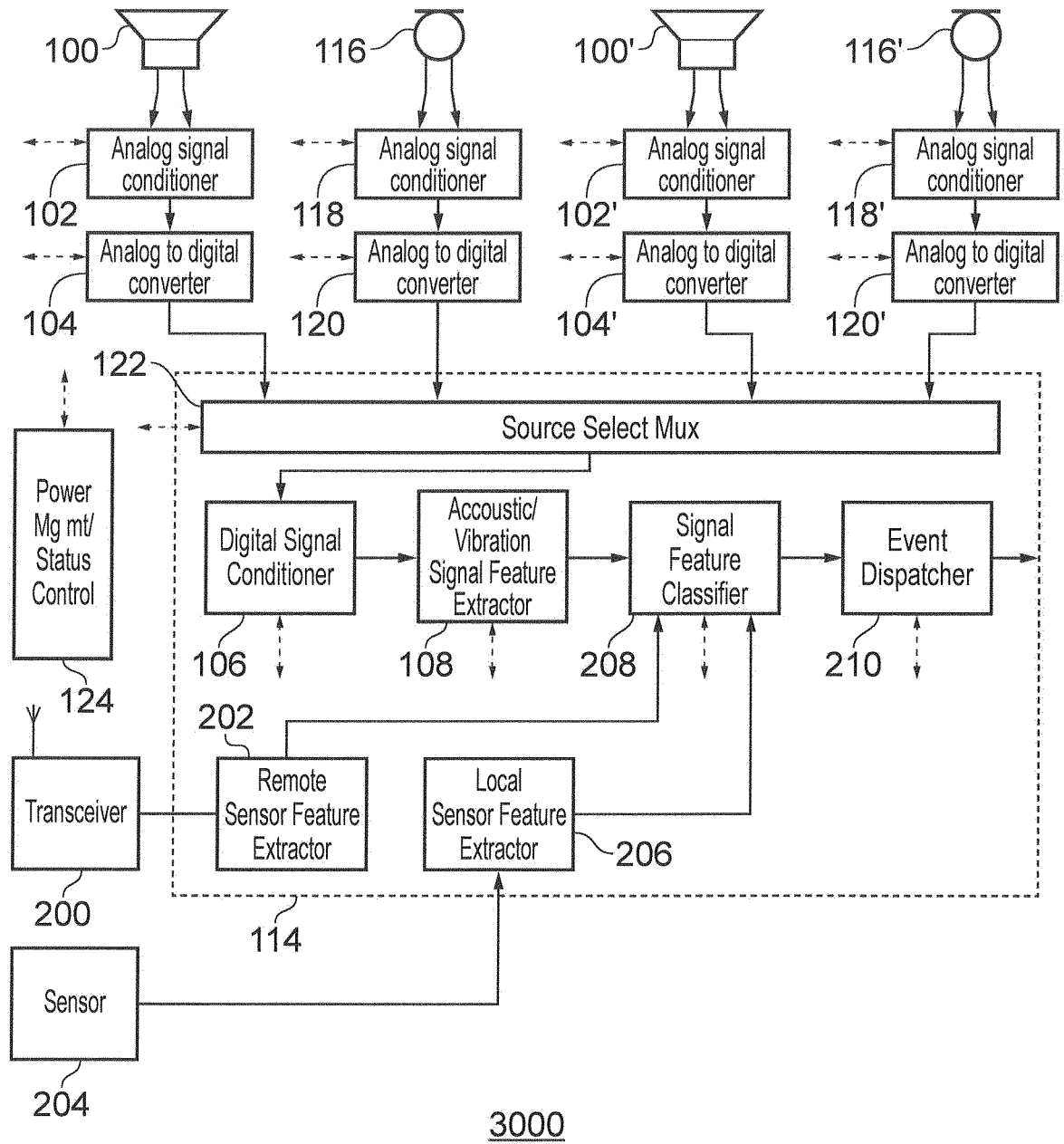
FIG. 3 shows a mobile device according to an embodiment.

FIG. 3 shows a further mobile device 3000. A loudspeaker 100 may have the terminals connected to the input of an analog signal conditioner 102. An output of the analog signal conditioner 102 may be connected to an analog to digital convertor 104. The output of an analog to digital converter 104 may be connected to a signal source multiplexer 122. A second loudspeaker 100' may have the terminals connected to the input of an analog signal conditioner 102'. An output of the analog signal conditioner 102' may be connected to an analog to digital convertor 104'. The output of an analog to digital converter 104' may be connected to a signal source multiplexer 122.

A microphone 116 may have the terminals connected to the input of a signal conditioner 118. An output of the signal conditioner 118 may be connected to an analog to digital convertor 120. The output of an analog to digital converter 120 may be connected to a signal source multiplexer 122. A second microphone 116' may have the terminals connected to the input of a signal conditioner 118'. An output of the signal conditioner 118' may be connected to an analog to digital convertor 120'. The output of an analog to digital converter 120' may be connected to a signal source multiplexer 122.

The output of the signal source multiplexer 122 may be connected to the digital signal conditioner 106. An output of digital signal conditioner 106 may be connected to a signal feature extractor 108. An output of the signal feature extractor 108 may be connected to the input of the classifier module 208. Classifier module 208 may compare an output of the signal feature extractor 108 with a predetermined set of expected features. A RF transceiver 200 may be connected to a remote sensor feature extractor 202. An output of the remote sensor feature extractor 202 may be connected to the classifier module 208

A sensor 204 which may be a proximity sensor or a motion sensor may be connected to a local sensor feature extractor 206. An output of the local sensor feature extractor 206 may be connected to the classifier module 208.

An output of the classifier module 208 may be connected to the event dispatcher 212.

Power management and control module 124 may be connected to other modules to control the power supply and also monitor the status of the various other modules. The connection between the power management and control module 124 shown by the dashed line connections.

The operation of mobile device 3000 is similar to that of mobile device 2000. In addition mobile device 3000 may combine features extracted from other local sensors such as a motion sensor with the vibration feature extraction to provide more complex user encoded signals. For example the mobile device 3000 may decode an encoded user signal provided by a user based on a sequence of taps and the position or orientation of the mobile device 3000.

The mobile device may receive a remotely encoded user signal via transceiver 200. The remotely encoded signal may be compared to a locally generated user encoded signal by classifier module 208. If a match is detected, the matched signal may be output to the decoder/event dispatcher 210. An event may be for example to authenticate a transmission to the device which generated the remotely encoded signal.

Components of the mobile device 2000 may be implemented as hardware, software or a combination of hardware and software. For example signal source multiplexer 122, digital signal conditioner 106, signal feature extractor 108, signal feature classifier 208, event dispatcher 210, remote sensor feature extractor 202 and local sensor feature extractor 206 may be implemented as software modules executable by a programmable digital signal processor (DSP) 114. Power management module 124 may be implemented as a hardware circuit, in software or a combination of hardware and software.

Figure 4:
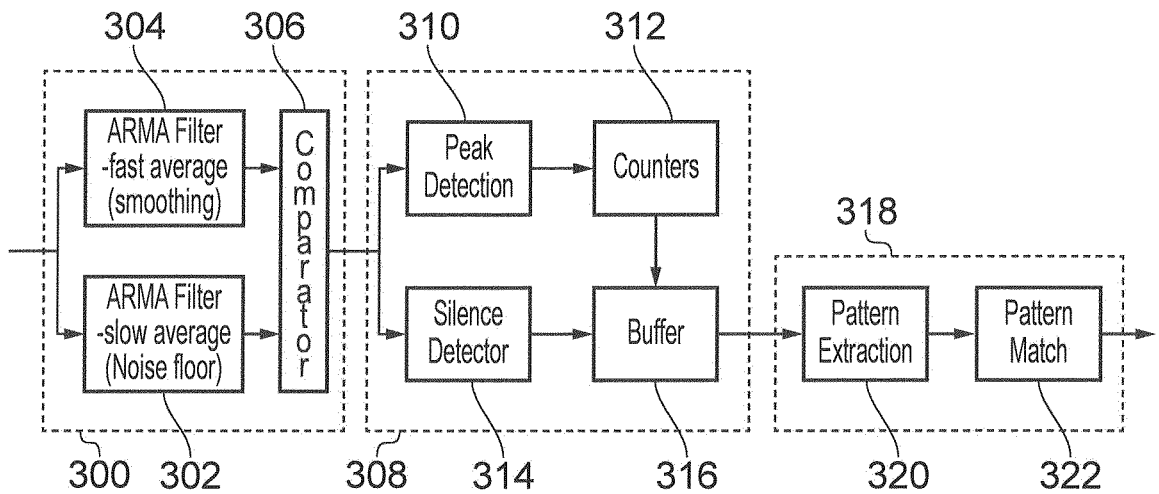
FIG. 4 illustrates a mobile device according to an embodiment.

FIG. 4 shows a mobile device 4000. Digital signal conditioner 300 includes a first FIR, IIR, autoregressive moving average (ARMA) filter or a nonlinear filter 302 which may be connected to a first input of a comparator 306. A second FIR, IIR, autoregressive moving average (ARMA) filter or a nonlinear filter 304 may be connected to a second input of the comparator 306. The input to the digital signal conditioner 300 may be connected to the input of the first ARMA filter 302 and the second ARMA filter 304. An output of the comparator 306 may be connected to the input of a feature extractor 308. Feature extractor 308 may include a peak detection module 310 having an input which may be connected to the output of the comparator 306. The feature extractor 308 may include a silence detector 314 having an input which may be connected to an output of the comparator 306. An output of the peak detection module 310 may be connected to a counter module 312. An output of the silence detector module 314 may be connected to a first input of buffer 316. An output of the counter module is 312 may be connected to a second input of buffer 316. The output of the buffer 316 may be connected to the classification module 318.

The classification module 318 may have a pattern extraction module 320 having an input connected to the output of buffer 316. The output of the pattern extraction module 320 may be connected to an input of the pattern match module 322.

In operation of the mobile device 4000, an input signal to the digital signal conditioner 300 may be generated as a result of a user encoded signal generated by tapping the mobile device 4000 and inducing a vibration which may be detected by a loudspeaker (not shown). The first ARMA filter 302 may have a longer average time period than the second ARMA filter 304. The first ARMA filter 302 may generate an artificial noise floor output. The second ARMA filter 304 may generate a smoothed version of the input signal to the digital signal conditioner 300. The comparator may compare the output of the first ARMA filter 302 and the second ARMA filter 304. If the output of the second ARMA filter 304 is greater than that of the first ARMA filter 302, then the comparator 306 may output a threshold at version of the smoothed signal output from the second ARMA filter. In this way, the input signal may be filtered to remove potential false triggers from the input signal.

Alternatively filters other than an ARMA filter, for example a digital linear filter or non-linear filter may be used to provide signal smoothing and artificial noise floor generation.

The peak detector 310 may detect peak values occurring in the thresholded signal received from the comparator 306. Each time a peak is detected, one of the counters in the counter module 312 may be incremented, and a value representing the peak may be output to the buffer 316. If a peak value is not detected within a certain time interval, the silence detector 314 may be triggered and output a value representing a silent interval to the buffer 316. A digital sequence representing an output pattern may be stored in the buffer by a combination of peaks detected by the peak detection module 310 and the silence intervals detected by the silence detector 314.

An encoded sequence stored in the buffers 316 may be transmitted to the classification/recognition module 318. The encoded sequence may be received by the pattern extractor 320 which may directly decode the encoded sequence for example by comparing with predetermined sequences in a look-up table. The extracted pattern may then be classified with respect to pre-existing patterns as will be appreciated by the skilled person in the pattern match module 322. As will be appreciated by the skilled person, dependent on the classification a decoded output signal indicative of a user command may be generated Mobile device 4000 may provide reliable detection an encoded user input caused by a user tapping or knocking the housing of the mobile device 4000 using a predetermined sequence.

Figure 5:
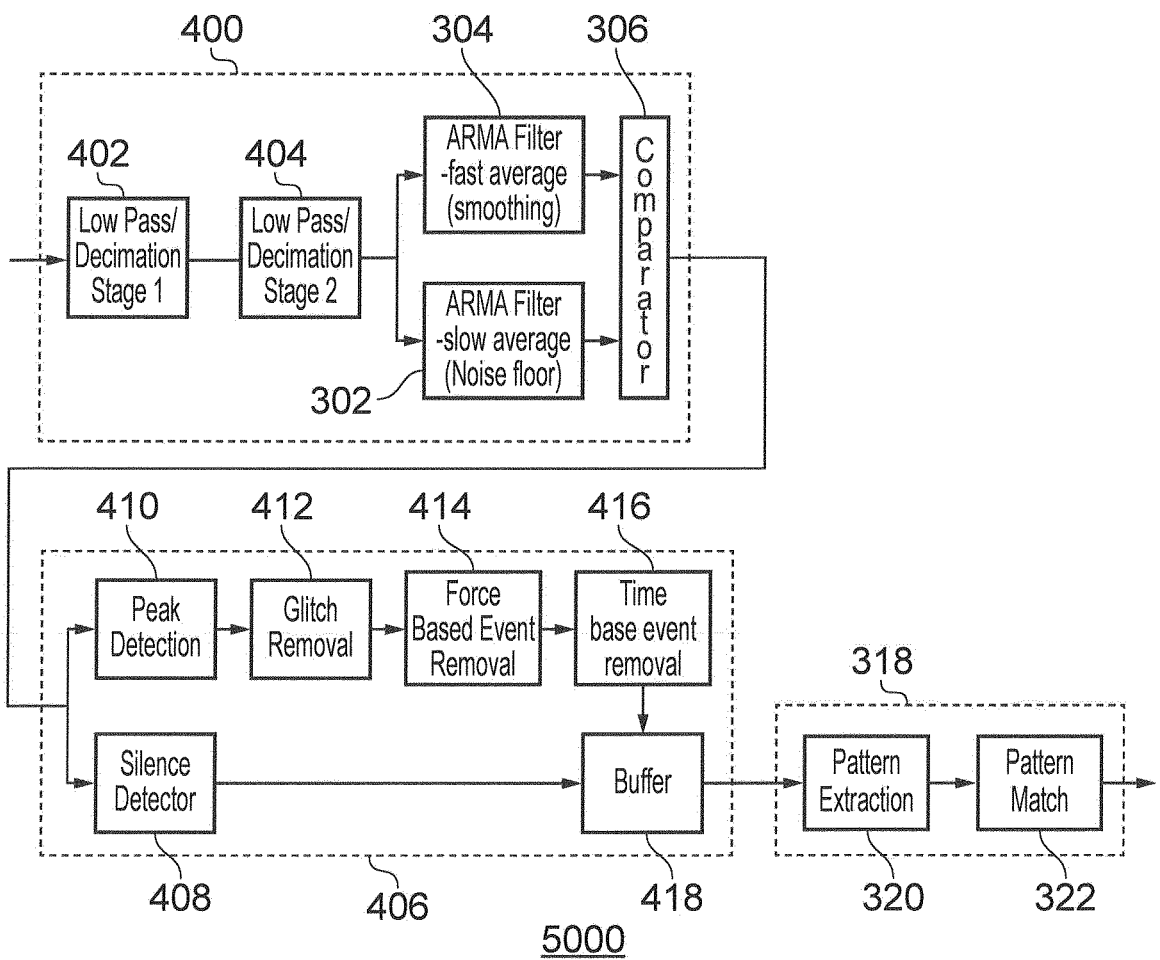
FIG. 5 shows a mobile device according to an embodiment.

FIG. 5 shows a mobile device 5000. Digital signal conditioner 400 includes a first low pass decimation filter which may limit the signal bandwidth to 2 KHz. The output of the first low pass decimation filter may be connected to the input of a second low pass decimation filter 404. The output of the second low pass decimation filter 404 may be connected to a first autoregressive moving average (ARMA) filter 302 and second ARMA filter 304. The first ARMA filter output may be connected to a first input of a comparator 306. A second ARMA filter 304 may be connected to a second input of the comparator 306. The input to the digital signal conditioner 300 may be connected to the input of the first ARMA filter 302 and the second ARMA filter 304. An output of the comparator 306 may be connected to the input of an acoustic/vibration feature extractor 406.

Signal feature extractor 406 may include a peak detection module 410 having an input which may be connected to the output of the comparator 306. The feature extractor 406 may include a silence detector 408 having an input which may be connected to an output of the comparator 306. An output of the peak detection module 310 may be connected to an input of glitch filter 412. An output of the glitch filter may be connected to an input of a force-based event removal module 414. An output of the force-based event removal module 414 may be connected to an input of a time-base event removal module 416. An output of time-based event removal module 416 may be connected to a first input of buffer 418, which may be a memory or a shift register. An output of the silence detector module 408 may be connected to a second input of buffer 418. The output of the buffer 418 may be connected to the classification module 318.

In operation of the mobile device 5000 an input signal to the digital signal conditioner 400 may be generated as a result of a user encoded signal generated by tapping the mobile device 5000 and inducing a vibration which may be detected by a loudspeaker (not shown).

The first low pass decimation filter 402 may reduce the signal bandwidth to around 2 KHz. The second low pass decimation filter 404 may reduce the signal bandwidth still further and provide fine-tuning for narrow-band energy detection. This may reduce the likelihood of false triggers and so improve the reliability of detection of an encoded user input.

The first ARMA filter 302 may have a longer average time period than the second ARMA filter 304. The first ARMA filter 302 may generate an artificial noise floor output. The second ARMA filter 304 may generate a smoothed version of the input signal to the digital signal conditioner 300. The comparator may compare the output of the first ARMA filter 302 and the second ARMA filter 304. If the output of the second ARMA filter 304 is greater than that of the first ARMA filter 302, then the comparator 306 may output a threshold at version of the smoothed signal output from the second ARMA filter. In this way, the input signal may be filtered to remove potential false triggers from the input signal.

The peak detector 410 may detect peak values occurring in the thresholded signal received from the comparator 306. The glitch filter 412 may remove peaks detected based on analysis of the timing and amplitude of the detected peaks. Force-based event removal module 414 may remove an event if it is not within an expected distribution of amplitudes, assuming that a user will tap the housing of a mobile device 5000 in a uniform manner. Timing-based even removal module 416 may remove events which occur too frequently within a predetermined time interval. If a peak value is not detected within a certain time interval, the silence detector 408 may be triggered and output a value representing a silent interval to the buffer 418. A digital sequence representing an encoded output pattern or sequence may be stored in the buffer by a combination of the silence intervals detected by the silence detector 314 and peaks detected by the peak detection module 410 that remain after processing by glitch filter 412, force-based event removal module 414 and time-based event removal module 416. The encoded output sequence may be transmitted to the pattern classifier 318 for classification and/or decoding. The decoded output signal from the pattern classifier 318 may trigger a user command.

Mobile device 5000 may reliably detect user encoded input signals generated by a user tapping or knocking the housing of the mobile device 5000.

Figure 6:
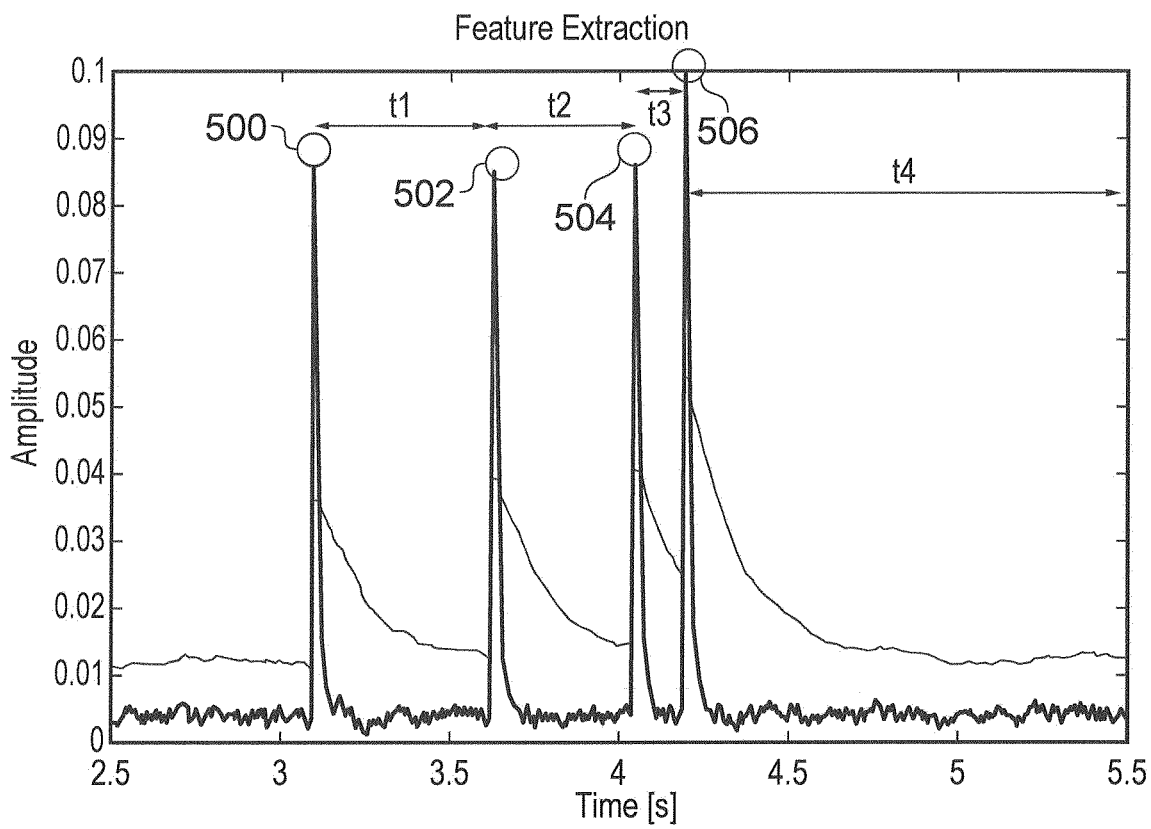
FIG. 6 illustrates an example encoded user input signal.

FIG. 6 shows a graph 6000 illustrating an example of encoded input signal generated by a loudspeaker in response to the user repeatedly tapping the housing of a mobile device. The graph 6000 shows the variation of amplitude on the y-axis between 0 V and 0.1 V with respect to time illustrated by the x-axis starting from a time of 2.5 seconds and ending at a time of 5.5 seconds. In this example, the features extracted from the input signal are peaks which may be detected for example by comparing the amplitude value with a threshold and also the change in amplitude with respect to time. Once the first peak 500 has been detected, a counter may measure the time between the first peak detected 500 and the second peak 502. The time interval t1 between the first peak 500 and the second peak 502 may be compared to a reference time tref which may for example represent the expected time between two successive taps, or knocks by a user. If time interval t is greater than Tref, then the first peak 500 and the second 502 may encode a binary sequence 101. If time interval T1 is less than or equal to Tref, then the first and the second tap may encode a binary sequence 11. In this example, Tref is 300 milliseconds, the time interval t1 between the first peak 500 and the second peak 502 is 500 milliseconds, the time interval t2 between the second peak 502 and the third peak 504 is 400 milliseconds, and the time interval t3 between the third peak 504 and the fourth peak is 200 milliseconds. Consequently, the binary sequence encoded by the input signal shown in FIG. 6000 may be 101011.

If a time from detection of a first peak is greater than a second longer reference time Tsilence, then this may be considered as the end of the encoding sequence. In the example illustrated in FIG. 6, this may be considered to be time t4 after peak 506. If silence is detected this may be used to for example restart an encoding sequence.

Figure 7:
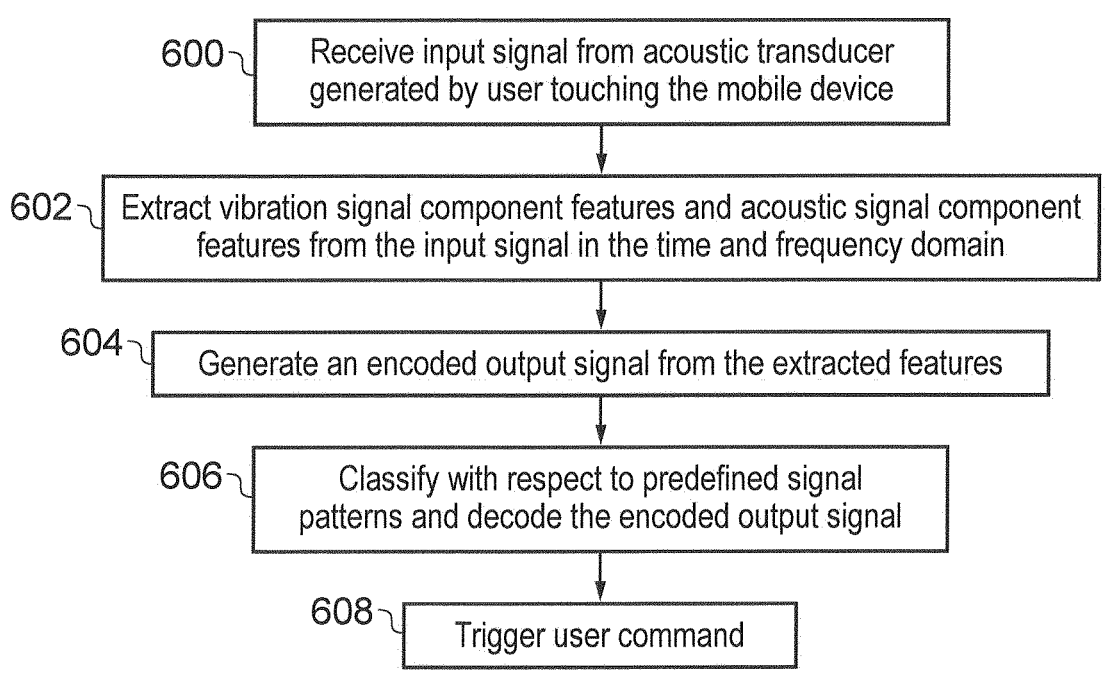
FIG. 7 shows a method of controlling a mobile device according to an embodiment.

FIG. 7 illustrates an example method of controlling a mobile device. In step 600 an input signal may be received from acoustic transducer which may be either a microphone or a loudspeaker. The input signal may be induced in the acoustic transducer in response to a user touching the device to provide an encoded user input. The user may provide an encoded input for example by combinations of patterns of finger-tapping, nail-tapping, swiping the mobile device or a combination. In step 602 vibration and acoustic signal component features may be extracted from the input signal in the time and frequency domain. The skilled person will appreciate that the signal may be transformed using a Fourier transform or other appropriate transform as part of the feature extraction. In step 604 an encoded output signal may be generated from the extracted features. In step 606 the encoded output signal may be classified with respect to predefined signal patterns using classification methods such as a Bayesian network, a Gaussian mixture model, a K-nearest neighbour classification and a Support vector machine. Alternatively or in addition the encoded output signal may be decoded for example using a binary comparison, or a look-table. The skilled person will appreciate that other classification or decoding techniques may be used. The result of the classification and decoding may be a decoded signal output from step 606 which may trigger a user command in step 608. Example user commands may include to wake-up the mobile device, check email on the device, and to pair the mobile device with another device by authenticating a wireless connection.

Figure 8:
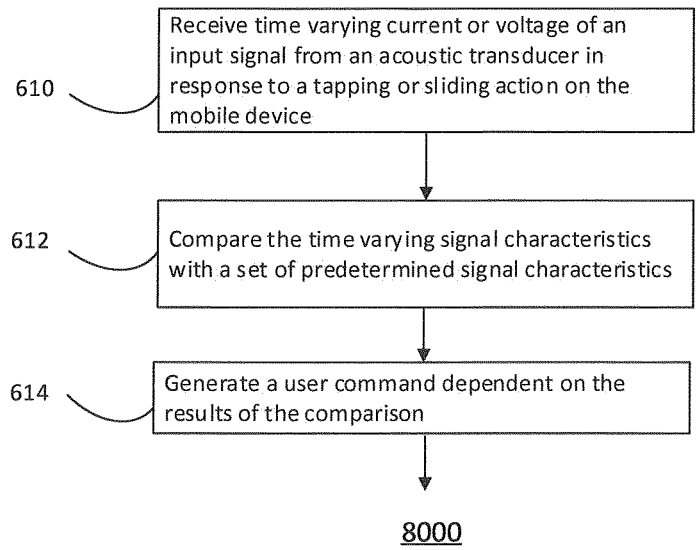
FIG. 8 illustrates a method of controlling a mobile device according to an embodiment.

FIG. 8 shows a method of operating a mobile device 8000. In step 610 a time varying current and/or voltage of an input signal may be received from an acoustic transducer. The time varying current and/or voltage may be generated in response to a tapping action being performed by a user on the mobile device. In step 612, the time varying signal characteristics may be compared with a said predetermined set of signal characteristics. These characteristics may include for example the variation of amplitude over time, the variation of frequency over time, the peak amplitude or amplitudes. Based on the results of this comparison a user command may be generated, which may correspond to a desired user action. The method steps performed by the method 8000 may for example be implemented in software or hardware in one or more of the examples herein described.

Figure 9:
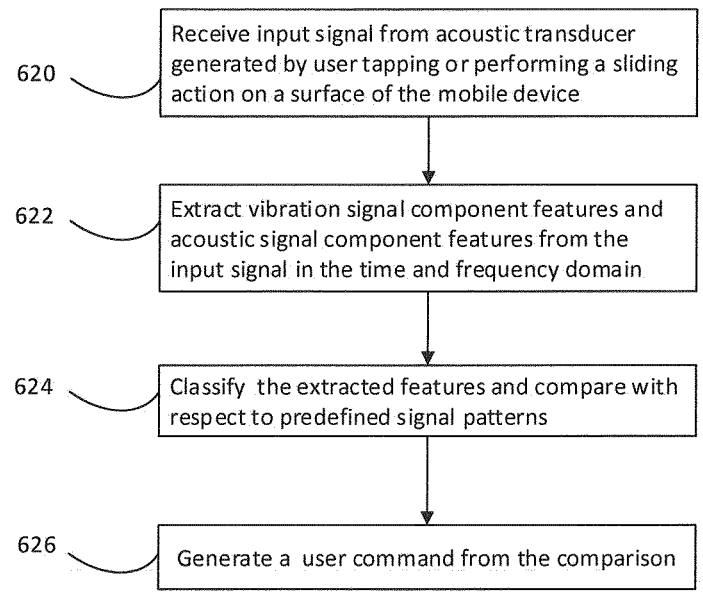
FIG. 9 shows a method of controlling a mobile device according to an embodiment.

FIG. 9 illustrates a further method of operating a mobile device 9000. In step 620 a time current and/or voltage from an acoustic transducer such as a loud speaker and microphone which has been generated in response to a user performing a tapping or sliding action on a surface of the mobile device may be received. In step 622 a vibration signal component feature or an acoustic signal component feature may be extracted from the input signal in both the time and the frequency domain. The signal features may include for example the frequency distribution of the variation of amplitude over time or the peak amplitude values. In step 624 the extracted features may be classified and compared to predefined signal patterns. The predefined signal patterns may correspond to expected responses from a user input cause by tapping or sliding surface of the mobile device. If a match is determined between the extracted features and at least one of the predetermined set of features, then a user command may be generated in step 626.

Figure 10:
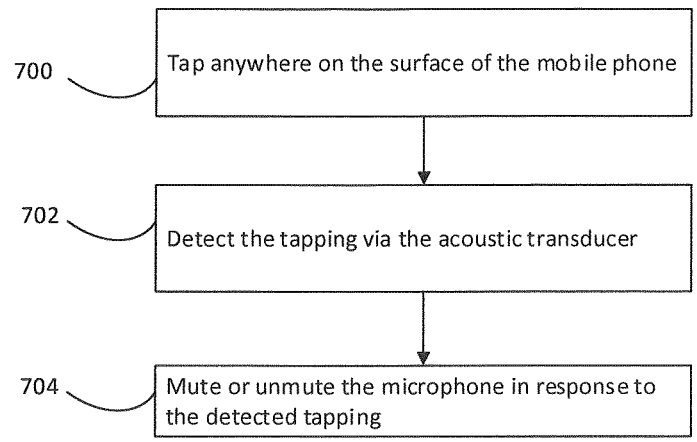
FIG. 10 illustrates a method of muting or unmuting a microphone on a mobile phone according to an embodiment.

FIG. 10 illustrates a method of controlling a mobile phone such as a smart phone 10000. In step 700 a user may tap anywhere on the surface of the mobile phone. In step 702 a tapping action may be detected via an acoustic transducer of the mobile phone, for example the loudspeaker or the receiver speaker. It will be appreciated that this tapping detection may be implemented by one or more of the examples herein described. In step 704 the microphone of the mobile phone may be muted or unmuted in response to the detected tapping. The detected tapping may be a predetermined sequence of taps or a single tap. A tap sequence may be timed taps, Morse code style taps which control the phone. By controlling the muting or unmuting of the microphone using tap detection via an acoustic transducer, the mobile phone itself does not have to be moved from the user's ear during a handset call. Furthermore there is no unwanted muting or unmuting due to the mute button on a display screen of the smart phone being activated while the phone is press to a user's face. This may occur in conventional smart phones, as the proximity sensor which is typically included in the phone and is used to detect when the phone is close to a user's ear is not always reliable.

In other examples, the phone may switch between two incoming phone calls in response to a user tapping the phone. In further examples, a voice recorder function may be started and stopped in response to a user tapping the mobile phone. In other examples, a snapshot of the display screen of a smart phone may be taken in response to a user tapping the phone.

Figure 11:
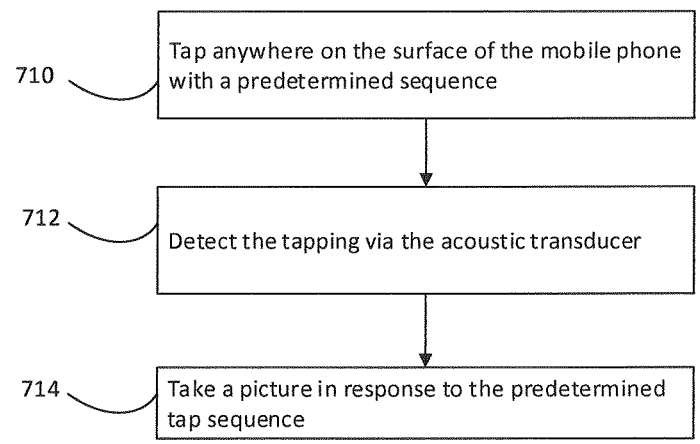
FIG. 11 shows a method of controlling a mobile phone to take a picture according to an embodiment.

FIG. 11 illustrates a further method of controlling a mobile phone including a camera 11000. In step 710 a user may tap anywhere on the surface of the mobile phone with a predetermined sequence. In step 712 the tapping action may be detected via an acoustic transducer of the mobile phone, for example the loudspeaker or receiver speaker. It will be appreciated that this tapping detection may be implemented by one or more of the embodiments herein described. In step 714 if the detected tapping sequence matches the predetermined sequence the mobile phone may be triggered to take a picture. By controlling the phone via an acoustic transducer a picture may be taken without starting up the display screen. In other examples a video recorder function may be started, stopped or paused in response to a user tapping the mobile phone.

Figure 12:
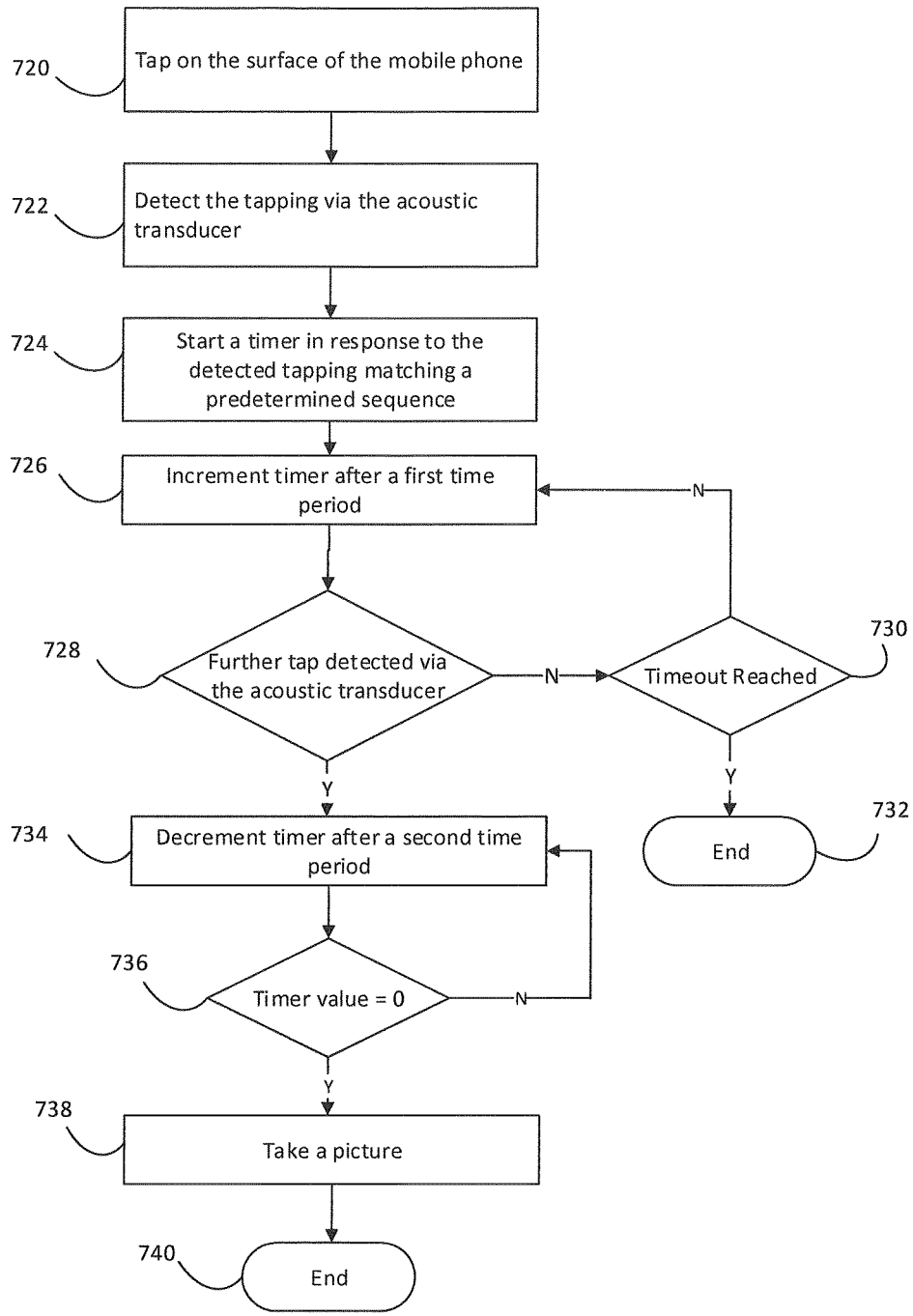
FIG. 12 shows a method of controlling a mobile phone to take a picture after a predetermined delay according to an embodiment.

FIG. 12 shows a method of operating a mobile phone with the camera 12000. In step 720 a user may tap anywhere on a surface of the mobile phone. In step 722 a signal induced on the terminals of the acoustic transducer in response to a user tapping may be detected. In step 724 a comparison may be made between the detected tapping sequence and one or more predetermined sequences. If the tapping matches a predetermined sequence then a timer may be started. In step 726 the time may be implemented after a first time period. In step 728 a check is made to determine whether a further tap or predetermined tap sequence has been detected by the acoustic transducer. If a further tap or predetermined tap sequence has not been detected the method moves to step 730 where a check is made to see whether the timeout has been reached. If, in step 738, a timeout has been reached then the method ends at step 732. If the timeout value has not been reached then the method step returns to step 726 and the time is incremented again after a first time period. Returning to step 728, if a further tap has been detected then the method moves to step 734 and the timer is decremented after a second time period, that is to say counts down from the timer value reached while incrementing. The second time period may be the same or different to the first time period of step 726. The method then moves to 736 where a comparison is made to check if the timer value has reached zero. If the timer value has not reached zero then the method returns to step 734 and the time is decremented again after a second time period. If the timeout value has reached zero in step 736 then a command is issued to take a picture in step 738 and the mobile phone takes the picture which may be for example a "Selfie". The method then finishes at step 740.

The method 12000 allows a timer based picture to be taken by tapping anywhere on the phone in a predetermined sequence and then tapping one or more times to indicate the timer delay. The first time period of step 726 may be much shorter, for example 10 times shorter, than the second time period of step 734. This may allow a timer to be set for example by an initial sequence of three taps to enable the timer at step 724. If a further tap is then detected, for example 1 second later, this may corresponding to a required timer delay of 10 seconds.

Figure 13:
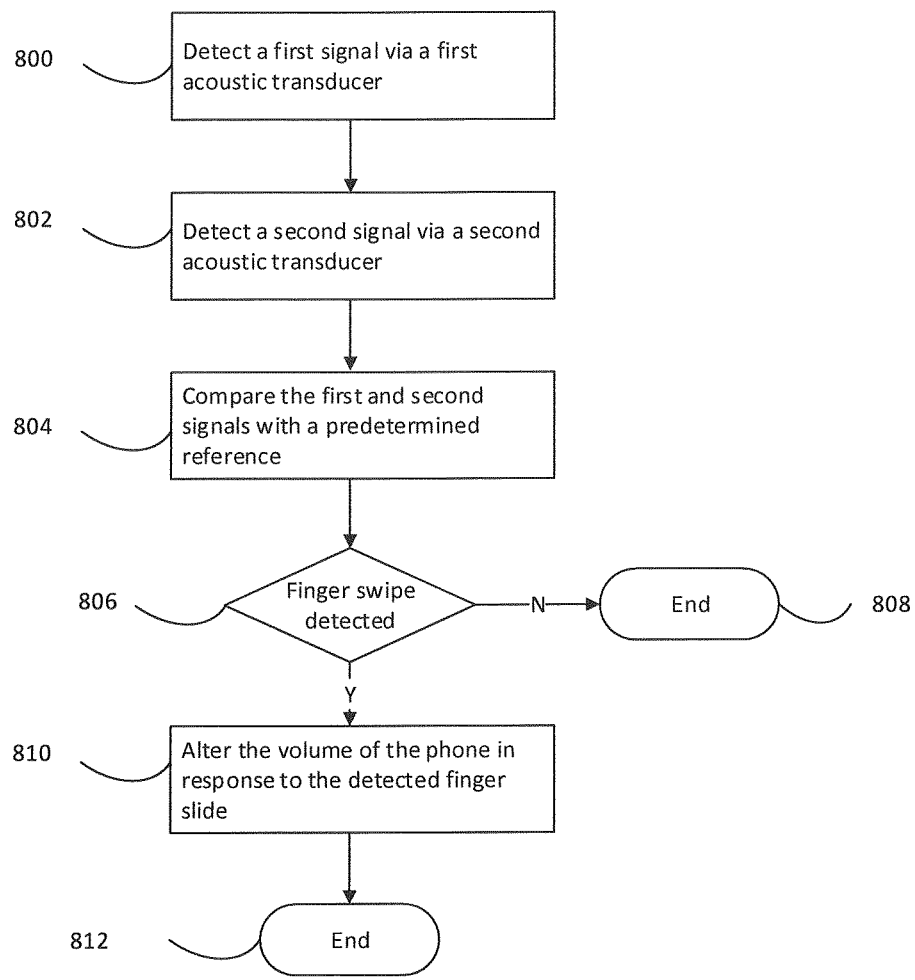
FIG. 13 illustrates a method of controlling a mobile device according to an embodiment.

FIG. 13 shows a further method of operating a mobile device 13000. In step 800, a first signal may be detected via a first acoustic transducer. In step 802, a second signal may be detected via second acoustic transducer. In step 804 the first and second signals may be compared with a predetermined reference. In step 806, a comparison may be made between the first and second detected signals and one or more of the predetermined reference signals to determine whether or not a finger swipe has been detected. If a finger swipe has not been detected then the process ends in step 808. If a finger swipe has been detected in step 806, then the method moves on to step 810 where the volume of the mobile phone may be altered in response to the detected finger slide. The method then ends at step 812.

It will be appreciated that other commands may be executed is in response to a detected finger slide such as for example a camera zoom, the ring tone volume, and also a phone lock or unlock command. By detecting a finger slide via the acoustic transducers, the action can be detected without adding additional sensors or using a touch screen user interface. The sliding action may be detected at any point on the housing of the mobile device including for example the major surface which is opposite the major surface including the display screen.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A mobile device comprising:
   an acoustic transducer comprising a pair of terminals;
   a controller coupled to receive a current and/or a voltage from the acoustic transducer;
   wherein the controller is configured to,
      receive time varying current and/or voltage values from the terminals of the acoustic transducer in response to a tapping and/or sliding motion on a surface of the mobile device; and
      generate a user command in response to a comparison between characteristics of the time-varying current and/or voltage values and a set of predetermined characteristics;
   wherein the controller includes a peak detector;
   wherein the peak detector is configured to detect peak values of the current and/or voltage values;
   wherein the controller is configured to generate the user command if a pattern of the detected peak values matches a predetermined pattern of peak values;
   wherein the controller includes a glitch filter;
   wherein the glitch filter defines an expected distribution of timing, force and position characteristics for the time varying current and/or voltage values;
   wherein the controller is configured to extract a set of timing, force and position characteristics from the detected current and/or voltage values; and
   wherein the controller is configured to remove certain detected current and/or voltage values that fall outside the expected distribution of timing, force and position characteristics.

2. The mobile device of claim 1:
   wherein the acoustic transducer includes a loudspeaker.

3. The mobile device of claim 1:
   wherein the acoustic transducer includes a microphone.

4. The mobile device of claim 1:
   further comprising a further acoustic transducer,
   wherein the user command includes a mute/unmute command and
   wherein the controller is further operable to mute or unmute at least one of the acoustic transducer and the further acoustic transducer.

5. The mobile device of claim 1:
   wherein the mobile device is configured as a sound recorder and the user command includes a start/stop command to start or stop the sound recorder.

6. The mobile device of claim 1:
   wherein the mobile device is a mobile phone,
   the mobile phone including,
      a first major surface having a display and
      a second major surface, and
   wherein the controller is operable to generate the user command in response to at least one of a tapping and/or sliding motion on the second major surface.

7. The mobile device of claim 6:
   wherein the at least one user command includes a command to switch between a first phone call and a second phone call and
   wherein the mobile phone is operable to switch between phone calls in response to a user tapping the second major surface of the mobile phone.

8. The mobile device of claim 1:
   wherein the mobile device is a camera,
   wherein the user command includes a command to take a picture.

9. The mobile device of claim 6:
wherein the display on the first major surface is disabled while the user command is processed by the controller in response to the tapping and/or sliding motion on the second major surface.

10. The mobile device of claim 1:
wherein the user command includes a mobile device unlock command.

11. The mobile device of claim 1:
wherein the characteristics of the time-varying current and/or voltage values include at least one of amplitude, phase, and frequency.

12. The mobile device of claim 1:
wherein the controller includes a silence detector;
wherein the silence detector is configured to set one or more silence values if the peak values are not detected within certain time intervals; and
wherein the controller is configured to generate the user command if a pattern of the peak values and silence values matches a predetermined pattern of peak values and silence values.

13. The mobile device of claim 1:
wherein the controller is configured to remove certain detected peak values that fall outside a set of peak value limits retrieved from the set of predetermined characteristics.

14. The mobile device of claim 1:
further comprising an orientation sensor configured to detect a physical orientation of the mobile device;
wherein the controller is configured to generate the user command only if the mobile device is positioned in a specific physical orientation.

15. The mobile device of claim 1:
further comprising a wireless transceiver coupled to receive a signal from an acoustic sensor in another wireless device;
wherein the controller is configured to authenticate a wireless connection between the mobile device and the another wireless device if the pattern of the detected peak values on the mobile device matches a pattern of detected peak values from the acoustic sensor in the another wireless device.

16. A mobile device comprising:
an acoustic transducer comprising a pair of terminals;
a controller coupled to receive a current and/or a voltage from the acoustic transducer;
wherein the controller is configured to,
  receive time varying current and/or voltage values from the terminals of the acoustic transducer in response to a tapping and/or sliding motion on a surface of the mobile device; and
  generate a user command in response to a comparison between characteristics of the time-varying current and/or voltage values and a set of predetermined characteristics;
wherein the controller includes a peak detector;
wherein the peak detector is configured to detect peak values of the current and/or voltage values;
wherein the controller is configured to generate the user command if a pattern of the detected peak values matches a predetermined pattern of peak values;
wherein the mobile device is a mobile phone including,
  a first major surface having a display and
  a second major surface;
wherein the controller is operable to generate the user command in response to at least one of a tapping and/or sliding motion on the second major surface; and
wherein the display on the first major surface is disabled while the user command is processed by the controller in response to the tapping and/or sliding motion on the second major surface.

17. A mobile device comprising:
an acoustic transducer comprising a pair of terminals;
a controller coupled to receive a current and/or a voltage from the acoustic transducer;
wherein the controller is configured to,
  receive time varying current and/or voltage values from the terminals of the acoustic transducer in response to a tapping and/or sliding motion on a surface of the mobile device; and
  generate a user command in response to a comparison between characteristics of the time-varying current and/or voltage values and a set of predetermined characteristics;
wherein the controller includes a peak detector;
wherein the peak detector is configured to detect peak values of the current and/or voltage values;
wherein the controller is configured to generate the user command if a pattern of the detected peak values matches a predetermined pattern of peak values;
further comprising a wireless transceiver coupled to receive a signal from an acoustic sensor in another wireless device; and
wherein the controller is configured to authenticate a wireless connection between the mobile device and the another wireless device if the pattern of the detected peak values on the mobile device matches a pattern of detected peak values from the acoustic sensor in the another wireless device.

* * * * *